UNITED STATES PATENT OFFICE.

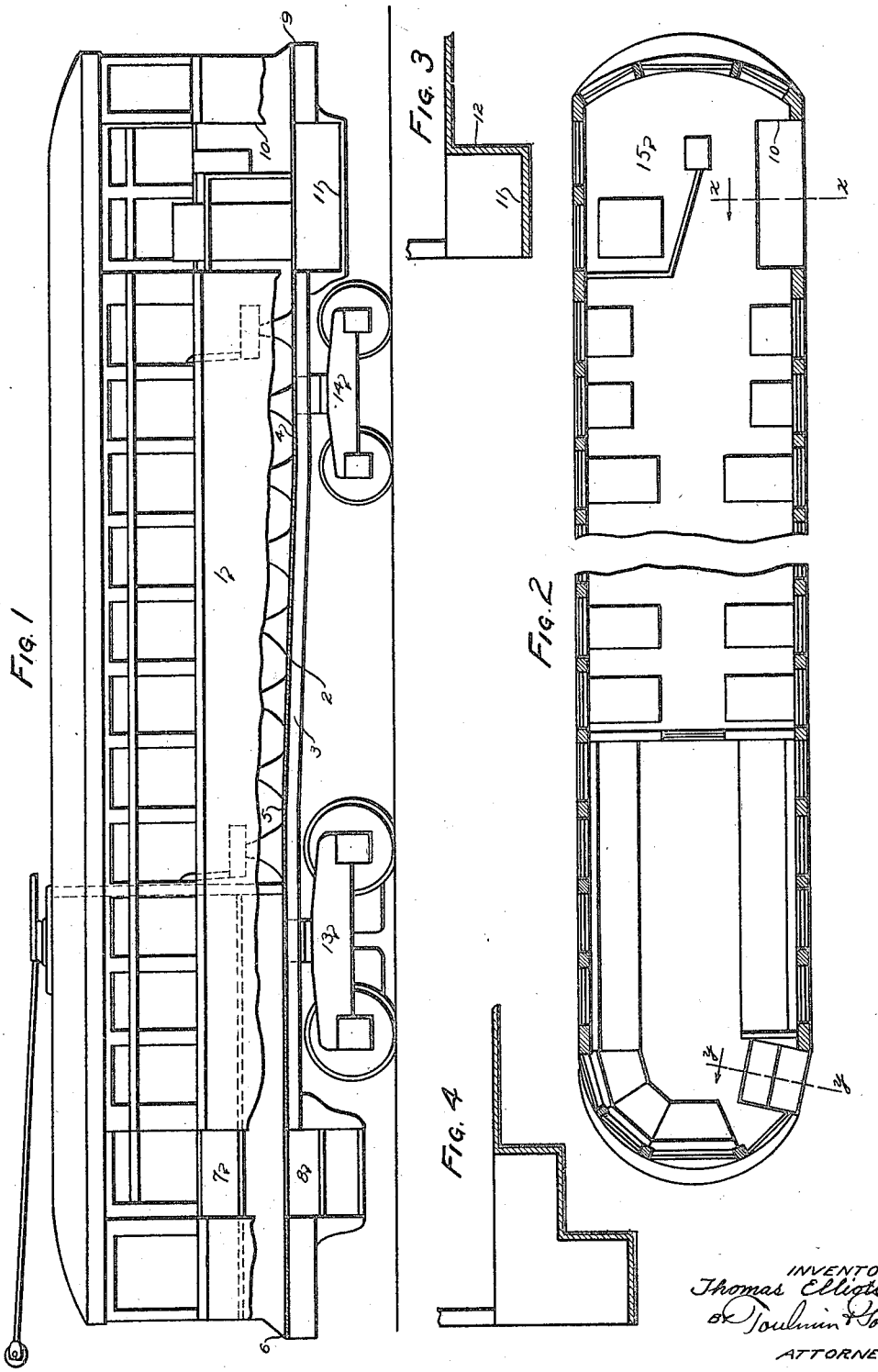

THOMAS ELLIOTT, OF CINCINNATI, OHIO, ASSIGNOR TO THE CINCINNATI CAR COMPANY, OF CINCINNATI, OHIO, A CORPORATION OF OHIO.

RAILWAY-CAR.

1,386,851. Specification of Letters Patent. Patented Aug. 9, 1921.

Application filed March 21, 1921. Serial No. 454,028.

*To all whom it may concern:*

Be it known that I, THOMAS ELLIOTT, a citizen of the United States, residing at Cincinnati, in the county of Hamilton and State of Ohio, have invented certain new and useful Improvements in Railway-Cars, of which the following is a specification, reference being had therein to the accompanying drawing.

This invention relates to railway cars, particularly of the type for use on street railways and interurban lines.

My car embodying this invention may properly be designated as a single-end, double-truck, one-man car and its novelty and distinguishing feature lies in a ramped floor, the ramp or inclined portion extending essentially between the trucks, the lower end of the ramp portion joining ultimately with the floor of a lowered platform and the higher end of the ramped portion joining ultimately with an unlowered platform floor so that one car step may be used at the forward or lowered end where the passengers shall generally enter and leave the car; and in combining with this arrangement of floor a motor truck with larger wheels beneath the unramped portion and another truck with smaller wheels beneath the ramped portion.

The object in ramping the floor is to permit the use of one car step from the platform to the ground so that the passengers may leave or enter the car with greater rapidity because having to use only one car step in doing so.

In the accompanying drawings:

Figure 1 is a side elevation of a car embodying my invention with the side broken away to more clearly show the ramp of the floor;

Fig. 2 is a floor plan with the vertical timbers in section;

Fig. 3 is a sectional view on the line $x$—$x$ of Fig. 2 showing a part of the ramped floor and one car step; and Fig. 4 is a sectional view on the line $y$—$y$ of Fig. 2 showing a part of the unramped floor and two car steps.

A car of any acceptable design or type is designated 1 and my ramped floor indicated at 2. This portion of the floor and its understructure, such as the sill 3, is inclined from a point 4 substantially over a portion of one truck to a point 5 substantially over or near the motor-truck. The floor from the point 5 on to the point 6 is horizontal, or substantially so, that part from near the door 7 and steps 8 on to the end being regarded as the platform. And from the point 4 to the forward end of the car at 9 the floor is again substantially horizontal but on a level with the lower end of the ramped portion. And that part of the floor adjacent the ingress and egress doorway 10 constitutes the forward platform. Here it will be observed that there is but one car step 11 and hence but one riser 12 between it and the floor.

Thus, by ramping the floor of the car body in the manner indicated I am enabled to make my front platform low enough to render it practicable to use but one car step, and this without any step between the car floor and this forward platform. This one car step greatly facilitates the rapidity with which the passengers can enter and leave the car. The distance between the platform and the ground being thus reduced by reason of the use of the ramped floor the distance the passengers have to travel from the platform to the ground and from the ground to the platform, and hence the time they take to do so, is materially lessened, and the effort also on the part of the passengers is much reduced since they have to make but two steps up and two steps down, rather than three steps up and three steps down, as at the other end of the car.

And also by reason of this ramped floor I am enabled to preserve ample space under the car for the motor-truck 13 with its larger wheels, say, 30 inches in diameter, while able to use a lower truck 14 with its smaller wheels, say, 24 inches in diameter.

The motorman will be located at or about the point marked 15 and by the use of suitable doors and their operating mechanism, not necessary to show in the drawings because no part of the present invention, he will be enabled to properly control the doorways for purposes of entrance and exit by passengers.

Thus it will be seen that I have provided a one-man, one-way, double-truck car with the highly important advantage of more rapid exit and entrance by the passengers due to the provision of the ramped floor, which results in the lowering of the main or front end of the car where the motorman is located; and results also in the elimination of steps between the car floor and the platform floor. The rear door at 7 is really an emergency door, although it may be used for ordinary exit and entrance under some conditions.

Having thus fully described my invention, what I claim as new and desire to secure by Letters Patent, is:—

1. In a passenger car, the combination, with a ramped floor extending from and over one truck to and over the other, the lower end joining and contiguous with the forward platform floor and the higher end joining and contiguous with the rear platform floor, of a motor-truck located essentially rearward of the higher end of the ramped portion and another truck located essentially forward of the lower end of the ramped portion.

2. In a passenger car, the combination, with a ramped floor extending from near one truck to the other, the lower end joining with the forward platform floor and the higher end with the rear platform floor, of a motor-truck located essentially rearward of the higher end of the ramped portion and another truck located essentially forward of the lower end of the ramped portion, and one step between the lower forward platform and the ground.

In testimony whereof, I affix my signature.

THOMAS ELLIOTT.